US012591778B2

(12) United States Patent
Bau et al.

(10) Patent No.: US 12,591,778 B2
(45) Date of Patent: Mar. 31, 2026

(54) SYSTEM AND METHOD FOR TORQUE-BASED STRUCTURED PRUNING FOR DEEP NEURAL NETWORKS

(71) Applicant: Samsung Electronics Co., Ltd., Suwon-si (KR)

(72) Inventors: Tien C. Bau, Irvine, CA (US); Arshita Gupta, Irvine, CA (US); Hrishikesh Deepak Garud, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 717 days.

(21) Appl. No.: 18/052,297

(22) Filed: Nov. 3, 2022

(65) Prior Publication Data

US 2023/0153625 A1 May 18, 2023

Related U.S. Application Data

(60) Provisional application No. 63/280,564, filed on Nov. 17, 2021.

(51) Int. Cl.
*G06N 3/08* (2023.01)
*G06N 3/082* (2023.01)

(52) U.S. Cl.
CPC .................................... *G06N 3/082* (2013.01)

(58) Field of Classification Search
CPC ...... G06N 3/082; G06N 3/0464; G06N 20/00; G06N 20/10; G06N 3/045; G06N 3/084; G06N 5/01
See application file for complete search history.

(56) References Cited

U.S. PATENT DOCUMENTS 10,740,676 B2    8/2020    Durdanovic et al.
11,164,084 B1    11/2021    David et al.
(Continued)

FOREIGN PATENT DOCUMENTS

CN        111260034 A        6/2020
CN        112396181 A        2/2021
(Continued)

OTHER PUBLICATIONS

International Search Report and Written Opinion of the International Searching Authority dated Feb. 24, 2023 in connection with International Patent Application No. PCT/KR2022/017994, 11 pages.
(Continued)

*Primary Examiner* — Masud K Khan

(57) ABSTRACT

A method includes accessing a machine learning model, the machine learning model trained using a torque-based constraint. The method also includes receiving an input from an input source and providing the input to the machine learning model. The method also includes receiving an output from the machine learning model. The method also includes instructing at least one action based on the output from the machine learning model. Training the machine learning model includes applying a torque-based constraint on one or more filters of the machine learning model, adjusting, based on applying the torque-based constraint, a first set of one or more filters of the machine learning model to have a higher concentration of weights than a second set of one or more filters of the machine learning model, and pruning at least one channel of the machine learning model based on an average weight for the at least one channel.

26 Claims, 12 Drawing Sheets

(56) References Cited

U.S. PATENT DOCUMENTS

| | | | |
|---|---|---|---|
| 11,200,495 B2 | 12/2021 | Wang et al. | |
| 11,301,727 B2 | 4/2022 | Hu et al. | |
| 2019/0251441 A1 | 8/2019 | Lu et al. | |
| 2020/0410357 A1 | 12/2020 | Ji et al. | |
| 2021/0150363 A1 | 5/2021 | Yang et al. | |
| 2022/0004955 A1* | 1/2022 | Neumann | G06F 16/285 |
| 2022/0292360 A1* | 9/2022 | Shen | G06N 3/045 |
| 2022/0292543 A1* | 9/2022 | Henderson | G06Q 30/0252 |

FOREIGN PATENT DOCUMENTS

| | | | |
|---|---|---|---|
| CN | 113657585 A | 11/2021 | |
| CN | 114626527 A | 6/2022 | |
| KR | 10-2256288 B1 | 5/2021 | |
| WO | 2021080873 A1 | 4/2021 | |

OTHER PUBLICATIONS

Supplementary European Search Report dated Aug. 19, 2024, in connection with European Application No. 22896024.1, 12 pages.
Liu, et al., "Learning Efficient Convolutional Networks through Network Slimming," 2017 IEEE International Conference on Computer Vision, IEEE, Oct. 2017, 9 pages.
Communication pursuant to Article 94(3) EPC dated Sep. 24, 2025, in connection with European Application No. 22896024.1, 11 pages.
Communication under Rule 71(3) EPC dated Jan. 30, 2026, in connection with European Application No. 22896024.1, 54 pages.

* cited by examiner

901

902

SYSTEM AND METHOD FOR TORQUE-BASED STRUCTURED PRUNING FOR DEEP NEURAL NETWORKS

CROSS-REFERENCE TO RELATED APPLICATION AND PRIORITY CLAIM

This application claims priority under 35 U.S.C. § 119(e) to U.S. Provisional Patent Application No. 63/280,564 filed on Nov. 17, 2021, which is hereby incorporated by reference in its entirety.

TECHNICAL FIELD

This disclosure relates generally to machine learning systems. More specifically, this disclosure relates to a system and method for torque-based structured pruning for deep neural networks.

BACKGROUND

The size of Deep Neural Network (DNN) models has continued to increase in order to accommodate and handle complex data and problems. The popularity and success of these DNN models is accompanied by a notable increase in computational power and parameter storage costs. This has resulted in the emergence of pruning techniques that focus on reducing the number of parameters in DNN models in order to reduce memory and hardware consumption while still trying to maintain good accuracy. Such pruning techniques can be broadly divided into unstructured and structured techniques. Current unstructured pruning methods reduce parameter count but require sparse matrix operation libraries and hardware capabilities which makes them impractical for hardware deployment. Current structured pruning methods like network slimming uses the scaling factor from batch normalization layers in DNN models to prune channels. Batch Normalization, however, can cause inefficiencies while training and can also reduce the test accuracy. Current pruning methods also show high drops in accuracy after pruning filters and require excessive fine-tuning to reach a stable model.

SUMMARY

This disclosure relates to a system and method for torque-based structured pruning for deep neural networks.

In a first embodiment, a method includes accessing, using at least one processor of an electronic device, a machine learning model, the machine learning model trained using a torque-based constraint. The method also includes receiving, using the at least one processor, an input from an input source. The method also includes providing, using the at least one processor, the input to the machine learning model. The method also includes receiving, using the at least one processor, an output from the machine learning model. The method also includes instructing, using the at least one processor, at least one action based on the output from the machine learning model.

In a second embodiment, an apparatus includes at least one processing device. The at least one processing device is configured to access a machine learning model, the machine learning model trained using a torque-based constraint. The at least one processing device is also configured to receive an input from an input source. The at least one processing device is also configured to provide the input to the machine learning model. The at least one processing device is also configured to receive an output from the machine learning model. The at least one processing device is also configured to instruct at least one action based on the output from the machine learning model.

In a third embodiment, a non-transitory computer readable medium contains instructions that when executed cause at least one processor to access a machine learning model, the machine learning model trained using a torque-based constraint. The medium further contains instructions that when executed cause the at least one processor to receive an input from an input source. The medium further contains instructions that when executed cause the at least one processor to provide the input to the machine learning model. The medium further contains instructions that when executed cause the at least one processor to receive an output from the machine learning model. The medium further contains instructions that when executed cause the at least one processor to instruct at least one action based on the output from the machine learning model.

In a fourth embodiment, a method includes training, using at least one processor of an electronic device, a machine learning model. The training includes applying a torque-based constraint on one or more filters of the machine learning model. The training also includes adjusting, based on applying the torque-based constraint, a first set of one or more filters of the machine learning model to have a higher concentration of weights than a second set of one or more filters of the machine learning model. The training also includes pruning at least one channel of the machine learning model based on an average weight for the at least one channel.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
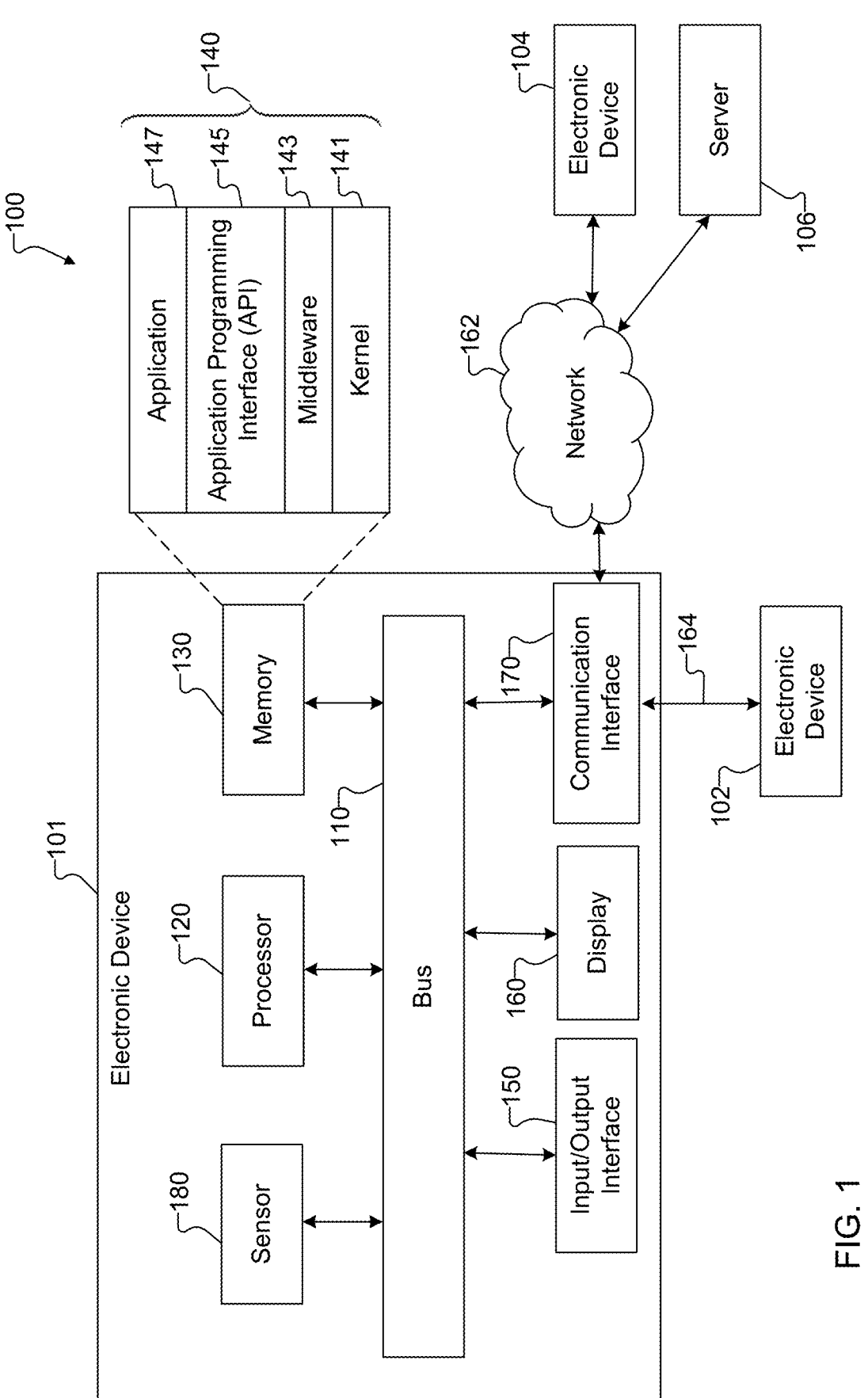
FIG. 1 illustrates an example network configuration including an electronic device in accordance with embodiments of this disclosure.

FIGS. 1 through 9B, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, the size of Deep Neural Network (DNN) models has continued to increase in order to accommodate and handle complex data and problems. The popularity and success of these DNN models is accompanied by a notable increase in computation power and parameter storage costs. This has resulted in the emergence of pruning techniques that focus on reducing the number of parameters in DNN models in order to reduce memory and hardware consumption while still trying to maintain good accuracy. Such pruning techniques can be broadly divided into unstructured and structured techniques. Current unstructured pruning methods reduce parameter count by removing unimportant connections with very small weights from the network, resulting in the final network consisting mostly of zeros. However, unstructured pruning methods require sparse matrix operation libraries and hardware capabilities which makes them impractical for hardware deployment.

Structured pruning techniques prune entire channels or filters depending on channel or filter wise sparsity. Such pruning techniques require less complex or no libraries for their implementation. Some structured pruning techniques use slimming which leverages the scaling factor gamma from batch normalization (BN) to prune channels that have small associated gamma factors. However, slimming comes with the cost of using the BN layer. BN was introduced to reduce the internal covariant shift after every convolutional layer. But, despite the fact that BN provides multiple advantages like faster convergence and less reliance on initial weights, use of BN can often backfire. Recent studies have shown that BN is unstable when using small batch sizes and leads to increased training time. Furthermore, models using BN might fail in production when the distribution of training and test data is different as BN calculates the variability, mean, and standard deviation according to the training data. Current pruning methods also show high drops in accuracy after pruning filters and require excessive fine-tuning to reach a stable model.

To address the above issues, this disclosure provides a torque-based structured pruning technique that is not dependent on batch normalization. Torque is a force which is applied perpendicular to the line of action. Increasing the radius from the axis to where the force is applied increases the torque. This concept is leveraged in embodiments of this disclosure to provide for improved training and pruning techniques. In embodiments of this disclosure, torque is a constraint applied on the weights of output filters or channels of a machine learning model layer during training. The farther away from a selected pivot point, e.g., channel 0, the more constraint (torque) will be applied. In some embodiments of this disclosure, the initial channels of the layer can be forced to do most of the heavy lifting, ensuring a higher concentration of weights in the initial few channels. Once a stable condition is reached during training, the less dense channels or filters can be pruned and the model can be further fine-tuned.

In various embodiments, the torque-based pruning does not require any additional layers or changes to the model architecture, unlike network slimming where the use of a BN layer is essential. In some embodiments, the pruning techniques of this disclosure can be applied to output filters, input filters, or both. The torque-based techniques of this disclosure can reduce the total number of parameters while still maintaining high accuracy and can keep the structural integrity of the network by still maintaining the dense connections, leading to ease in implementation on hardware.

FIG. 1 illustrates an example network configuration 100 including an electronic device in accordance with embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may receive and process inputs (such as audio inputs, images, or other data) and provide the inputs to a machine learning model that has been trained using a torque-based constraint. The processor 120 can use the machine learning model to generate and receive an output from the machine learning model and instruct at least one action based on the output from the machine learning model. For example, the processor 120 may instruct the electronic device 101 to perform various actions of the electronic device 101, such as output an image classification, play audio, call a contact, or other actions. The processor 120 may also instruct other devices to perform certain operations or display content on one or more displays 160. The processor 120 may also receive inputs for training the machine learning model (such as data samples to be used in training the machine learning model) and manage such training by inputting the samples to the machine learning model, receive outputs from the machine learning model, apply torque-based constraints and prune the machine learning model, and/or execute learning functions (such as loss functions) to improve the machine learning model.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 includes one or more applications supporting the receipt of data inputs, processing the inputs using one or more machine learning models to generate predicted outputs, and executing tasks related to the inputs and outputs. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as audio or images.

The electronic device 101 further includes one or more sensors 180 that can meter a physical quantity or detect an activation state of the electronic device 101 and convert metered or detected information into an electrical signal. The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 includes at least one communication network, such as a computer network (like a local area network (LAN) or wide area network (WAN)), Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may receive and process inputs (such as audio inputs, images, or other data) and provide the inputs to a machine learning model that has been trained using a torque-based constraint. The server 106 can use the machine learning model to generate and receive an output and instruct at least one action based on the output from the machine learning model. The server 106 may also instruct other devices to perform certain operations (such as output an image classification, play audio, call a contact, or other actions) or display content on one or more displays 160. The server 106 may also receive inputs for training the machine learning model (such as data samples to be used in training the machine learning model) and manage such training by inputting the samples to the machine learning model, receive outputs from the machine learning model, apply torque-based constraints and prune the machine learning model, and/or execute learning functions (such as loss functions) to improve the machine learning model.

Although FIG. 1 illustrates one example of a network configuration 100 including an electronic device 101, various changes may be made to FIG. 1. For example, the network configuration 100 could include any suitable number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
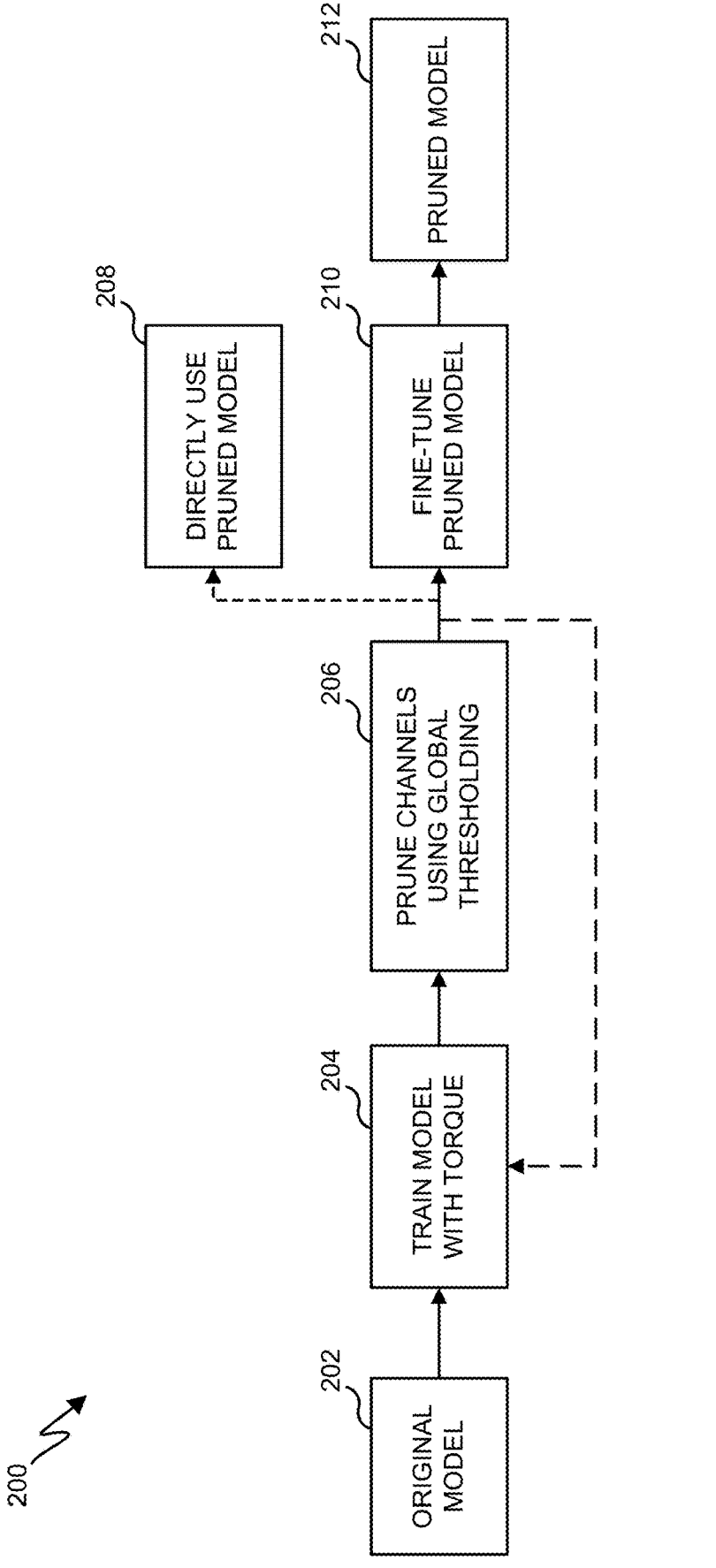
FIG. 2 illustrates an example process for training a machine learning model using torque-based constraints in accordance with embodiments of this disclosure.

FIG. 2 illustrates an example process 200 for training a machine learning model using torque-based constraints in accordance with embodiments of this disclosure. For ease of explanation, the process 200 shown in FIG. 2 is described as being performed using the server 106 in the network configuration 100 of FIG. 1. As a particular example, the process 200 can be executed on the server 106 in the network configuration 100 of FIG. 1, and a trained machine learning model can then be deployed to an electronic device, such as electronic device 101, for use. However, the process 200 may be used with any other suitable device(s), such as the electronic device 101, and in any other suitable system(s).

The process 200 includes accessing an original machine learning model 202, such as a DNN model, and, at step 204, training the machine learning model 202 with torque. Torque is generally a force which is applied perpendicular to the line of action, where increasing the radius from the axis to where the force is applied increases the torque. Embodiments of this disclosure use this concept of torque by applying, during one or more training phases, torque as a constraint on the weights of output filters or channels of a machine learning layer, such as a convolution layer, of the machine learning model 202. The farther away from a pivot point channel (e.g., channel 0), the more constraint (torque) will be applied. Increasing the intensity of the torque constraint when moving away from a selected pivot point channel, such that channels farther away from the pivot point are penalized more, leads to an increasing weight sparsity as the distance from the pivot point increases. The applied torque can force the initial channels of the layer of the machine learning model to do most of the heavy computations. The torque-based constraint can thus ensure a higher concentration of weights in the initial few channels of the machine learning layer. Applying the torque-based constraint does not require any additional layers or changes to the architecture of the machine learning model 202, unlike in network slimming that uses a BN layer. In various embodiments of this disclosure, the torque-based constraint can be applied based on output channels, input channels, or both.

After applying the torque-based constraint to concentrate the weights to the initial set of channels, and once a stable condition is reached during the training, at step 206, one or more less dense channels and filters are pruned from the layer of the machine learning model 202. The pruning can be performed based on a threshold or other metrics, such as based on using the absolute weight of each of a set of filters or an average weight of the channels. Pruning thus causes channels with a density below a specified threshold to be removed from the layer, while keeping at least the selected pivot point channel. For example, as a result of applying the torque-based constraint and causing the weights of the layer to be concentrated in a set of initial channels, the channels in the layer that have a weight value falling below a threshold can be pruned from the machine learning model 202 to remove parameters from the machine learning model, reducing the size of the machine learning model and the number of computations performed by the machine learning model, while maintaining high accuracy, and which can allow the machine learning model to be efficiently deployed on devices such as the electronic device 101 to perform inferencing operations. Additionally, the process 200 can help to keep the structural integrity of the network of the machine learning model by still maintaining the dense connection, leading to ease in implementation on hardware.

As shown in FIG. 2, after the machine learning model 202 is pruned at step 206, the machine learning model could then be trained using a multi-step torque training method in which additional torque-based constraints are applied at step 204. The process 200 can include multiple rounds of torque training and pruning at steps 204, 206 depending on various factors such as the complexity of the machine learning model 202 and the needs of the hardware on which the model will be deployed after training. Additionally, because the torque-based training described in embodiments of this disclosure retains the dense filters, very little fine-tuning is needed for the trained machine learning model. Therefore, at step 208, the trained and pruned machine learning model can be deployed for direct use without fine-tuning the model, while still providing for a high accuracy rating. The trained and pruned machine learning model could be deployed at step 208 after one round of torque-based training or after multiple rounds.

In some embodiments, although the accuracy for the trained and pruned machine learning model remains high, fine-tuning of the machine learning model can be performed at step 210 to further increase the accuracy of the machine learning model. The pruned model is then deployed at step 212, such as on an electronic device used for inferencing using the trained and pruned machine learning model, such as electronic device 101.

Although FIG. 2 illustrates one example of a process 200 for training a machine learning model using torque-based constraints, various changes may be made to FIG. 2. For example, fine-tuning at step 210 can be performed after one round of torque-based training, after completing multiple rounds of torque-based training, or after each round of torque-based training in a multi-step torque-based training process. Additionally, in some embodiments, fine-tuning could be performed after the pruned model is deployed at step 208, such as, if during inferencing, a certain degree of inaccuracy is detected.

Figure 3A:
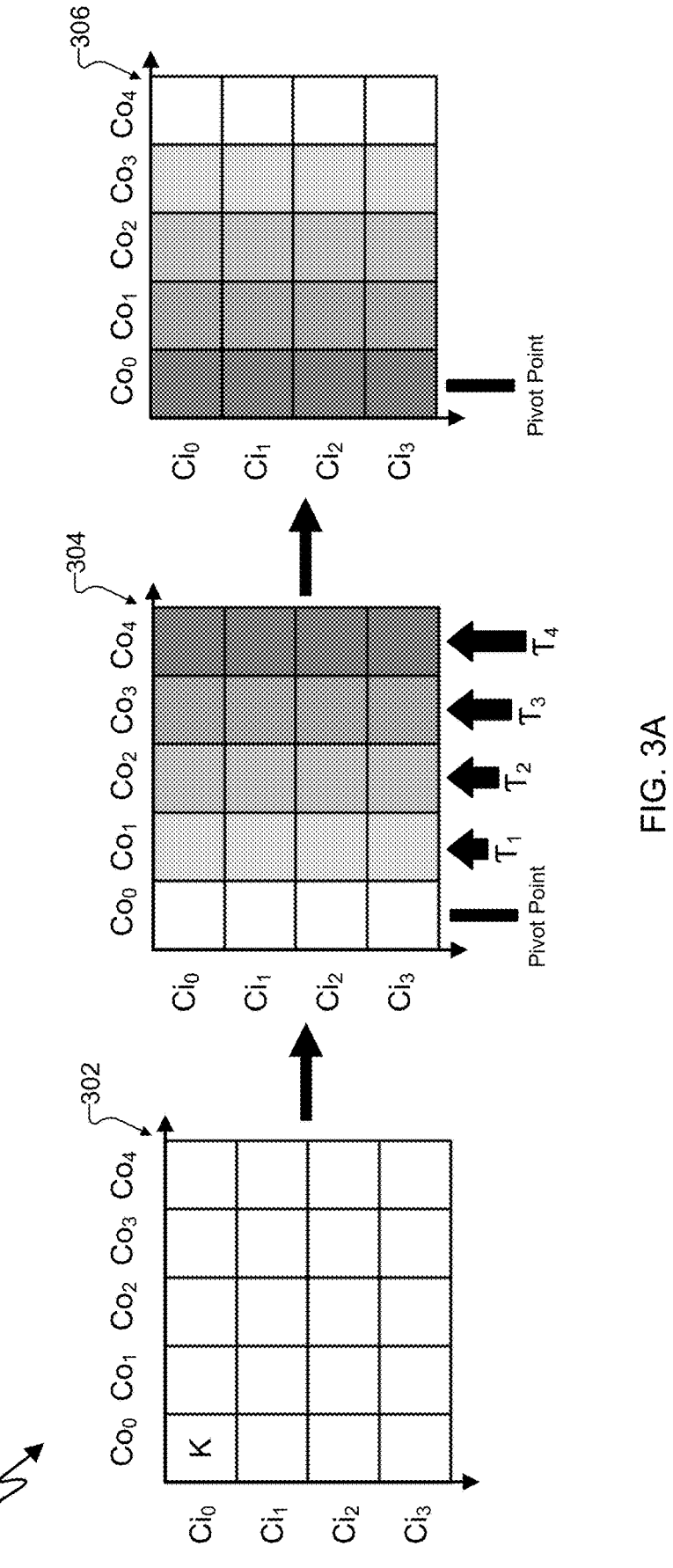
FIGS. 3A and 3B illustrate an example process for torque-based training and pruning based on output channels in accordance with embodiments of this disclosure.
Figure 3B:
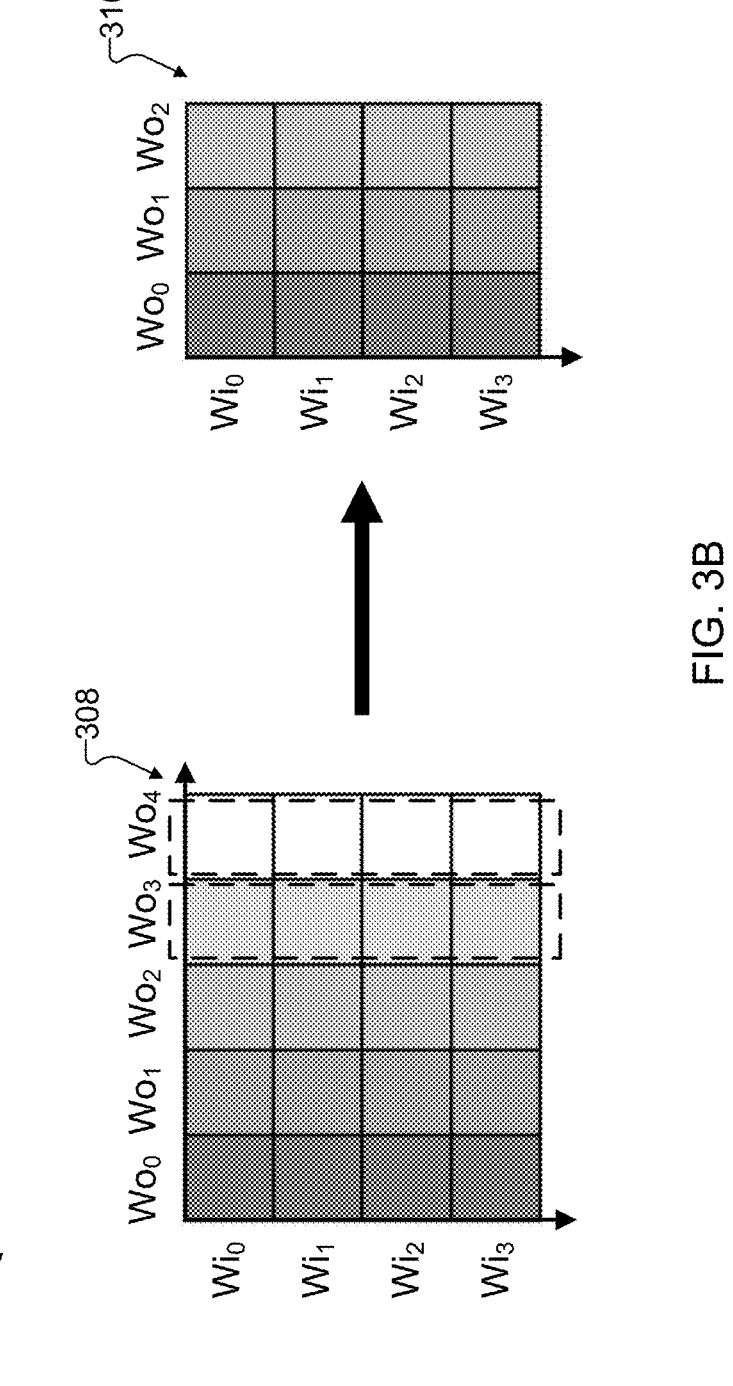

FIGS. 3A and 3B illustrate an example process 300 for torque-based training and pruning based on output channels in accordance with embodiments of this disclosure. For ease of explanation, the process 300 shown in FIGS. 3A and 3B is described as being performed using the server 106 in the network configuration 100 of FIG. 1. As a particular example, the process 300 can be executed on the server 106 in the network configuration 100 of FIG. 1, and a trained machine learning model can then be deployed to an electronic device 101 for use. However, the process 300 may be used with any other suitable device(s), such as the electronic device 101, and in any other suitable system(s).

Torque is a force which is applied perpendicular to the line of action and is typically represented as in Equation (1) below.

$$T = F \times d \tag{1}$$

Here, F represents the force and d represents the distance perpendicular to the line of action.

When applying torque to machine learning model layers during training in the various embodiments of this disclosure, torque is used as a constraint which is based on how far a given output filter is from the pivot point. For example, as illustrated in FIG. 3A, at step 302 of the process 300, a layer of a machine learning model, such as a convolutional layer, is accessed. The model layer includes a weight matrix having a plurality of input channels $Ci_0$ to $Ci_n$ and a plurality of output channels $Co_0$ to $Co_n$, each channel comprised of two-dimensional (2D) kernels K, in this example. At step 304, a pivot point is selected and a torque constraint is applied to the output channels of the model layer, with increasing intensity based on the distance of the output channels from the pivot point. For example, as shown in FIG. 3A at step 304, output channel $Co_0$ is selected as the pivot point, and each other output channel has an increasing torque intensity (T) applied based on its distance from the pivot point channel $Co_0$. This can be represented, for a weight matrix W, as in Equation (2) below.

$$T = F \times d = W \times d \tag{2}$$

Here, F represents the force and d represents the distance perpendicular to the line of action.

Thus, the pivot point here is the $0^{th}$ output channel/filter $Co_0$. The constraint applied to any output channel/filter is based on how far that output channel/filter is from the pivot point. If $d_1$, $d_2$, $d_3$, and $d_4$ are the distances from output channel $Co_0$ to output channels $Co_1$, $Co_2$, $Co_3$, and $Co_4$, respectively, then $d_4 > d_3 > d_2 > d_1$. For instance, as shown in step 304 in the example process 300, output channel $Co_4$ has a stronger torque intensity ($T_4$) applied than output channel $Co_3$, output channel $Co_3$ has a stronger torque intensity ($T_3$) applied than output channel $Co_2$, and output channel $Co_2$ has a stronger torque intensity ($T_2$) applied than the torque intensity ($T_1$) applied to output channel $Co_1$, as shown by the increasing darker shades of color of the filters at step 304. As shown at step 306 of the process 300, applying the torque-based constraint forces the output channels closer to the pivot point $Co_0$ to have higher concentrations of weights, as shown by the increasing darker shades of color of the filters at step 306.

In embodiments of this disclosure, while training the model, the forward function remains unaltered. However, during the backward pass, the torque constraint can be added as an additional term. For example, the torque constraint can be added to the gradient which is calculated per parameter. Equation (3) below represents an original loss function for training the machine learning model in accordance with embodiments of this disclosure.

$$L = \Sigma_{x,y} l(f(x, W), y) \tag{3}$$

Equation (4) below represents the loss function with an additional loss added based on the torque rate.

$$L = \Sigma_{x,y} l(f(x, W), y) + \lambda_T \Sigma T \tag{4}$$

Here, $\lambda_T$ represents the torque rate.

The gradient calculated with the additional loss can be represented as shown in Equation (5) below.

$$\nabla = \frac{\partial L}{\partial W} + \lambda_T \frac{\partial T}{\partial W} = \frac{\partial L}{\partial W} + \lambda_T \frac{\partial (Wxd)}{\partial W} \tag{5}$$

Here, $T=F\times d=W\times d$.

Adding the torque constraint to the gradient, calculated per parameter, can be represented as shown in Equation (6) below.

$$\nabla=\nabla+\lambda_T(\text{sign of } W)d \tag{6}$$

Like L1 regularization, adding the torque-based constraint in a linear manner based on the absolute value of magnitude as shown in Equations (4), (5), and (6) pushes the majority of the weights that are farther away from the pivot point to be zero and forces the channels/filters near the pivot point to be dense. Unlike network slimming which requires a BN layer, this torque-based training process can be applied directly to any model by simply modifying its gradient.

In some embodiments, instead of linearly adding the torque-based constraint to the gradient at every update as described above with respect to Equations (4), (5), and (6), similar results can be achieved by modifying just the loss function to add additional loss to the loss function during the backward pass based on torque as shown in Equations (7) and (8) below.

$$L=\Sigma_{x,y}l(f(x,W),y)+\lambda_T\Sigma(W\times d) \tag{7}$$

$$L=\Sigma_{x,y}l(f(x,W),y)+\lambda_T d\Sigma W \tag{8}$$

This additional loss can be back-propagated with the original loss to train the model.

In yet other embodiments, the gradient can be utilized similar to L2 regularization by adding a squared magnitude as a penalty. Equation (9) below represents the loss function with an additional loss added based on the torque rate.

$$L=\Sigma_{x,y}l(f(x,W),y)+\lambda^T\Sigma T^2 \tag{9}$$

The gradient calculated with the additional loss can be represented as shown in Equation (10) below.

$$\nabla = \frac{\partial L}{\partial W} + \lambda_T \frac{\partial T^2}{\partial W} = \frac{\partial L}{\partial W} + \lambda_T \frac{2(Wxd^2)}{\partial W} \tag{10}$$

Adding the torque constraint to the gradient, calculated per parameter, can be represented as shown in Equation (11) below.

$$\nabla=\nabla+\lambda_T 2d^2(W) \tag{11}$$

Like L2 regularization, adding the torque-based constraint in a squared manner as shown in Equations (9), (10), and (11) pushes the majority of the weights that are farther away from the pivot point to be very small and forces the channels/filters near the pivot point to be dense. In some embodiments, instead of adding the torque-based constraint to the gradient in a squared manner at every update as described above with respect to Equations (9), (10), and (11), similar results can be achieved by modifying just the loss function to add additional loss to the loss function during the backward pass based on torque as shown in Equations (12) and (13) below.

$$L=\Sigma_{x,y}l(f(x,W),y)+\lambda_T\varepsilon(W\times d)^2 \tag{12}$$

$$L=\Sigma_{x,y}l(f(x,W),y)+\lambda_T d^2\Sigma^2 \tag{13}$$

This additional loss can be back-propagated with the original loss to train the model.

Once the model is trained using the torque-based constraint(s), at step 308 illustrated in FIG. 3B, output channels/filters can be selected for pruning. For example, as shown in FIG. 3B, a trained weight matrix is accessed that includes weight input channels $Wi_0$ to $Wi_n$ that correspond to the original input channels $Ci_0$ to $Ci_n$, and weight output channels $Wo_0$ to $Wo_n$ that correspond to original output channels $Co_0$ to $Co_n$. As the torque-based constraint was applied based on output channels, output channels that are now less dense can be pruned from the model layer, such as based on a threshold or other metrics, such as based on using the absolute weight of each of a set of filters or an average weight of the channels.

Figure 4:
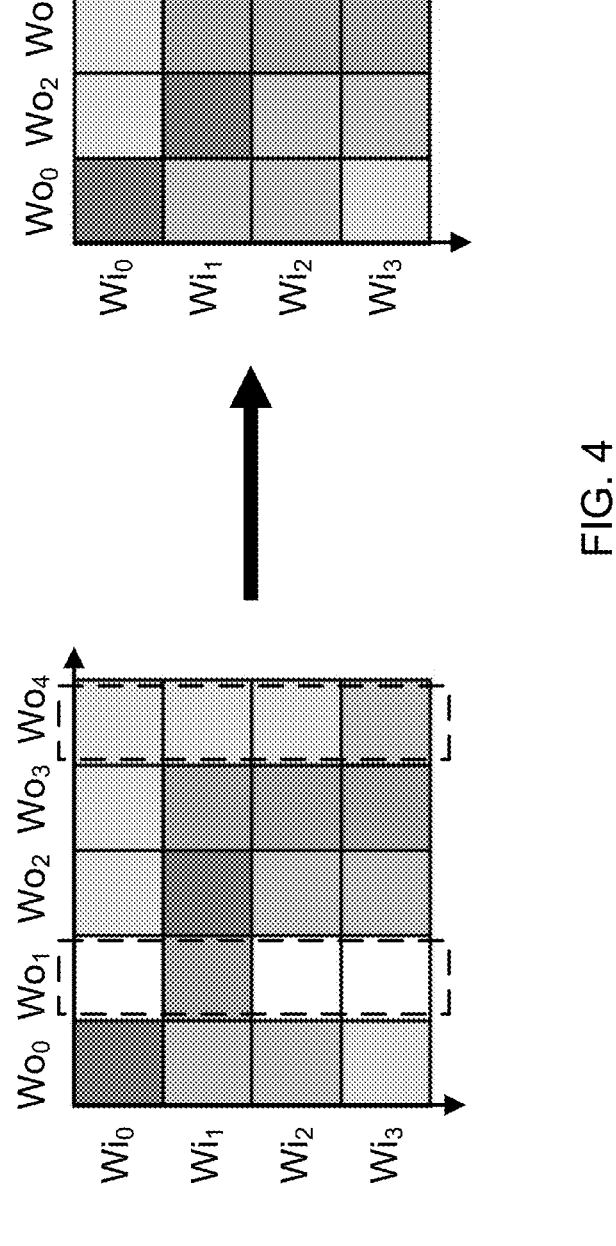
FIG. 4 illustrates an example non-torque-based pruning process.

In the example shown in step 308 of the process 300, the output channels $Wo_3$ to $Wo_n$ are selected for pruning due to their weight sparsity as a result of applying the torque-based training. These output channels are pruned from the model, resulting in a pruned model layer as shown in step 310 of the process 300. Since only the sparse filters have been removed, not much information is lost, and, consequently, the model maintains good accuracy and takes less time to reach stability. This provides a distinct advantage over existing pruning techniques. For example, FIG. 4 illustrates an example non-torque-based pruning process 400. As shown in FIG. 4, existing pruning processes include pruning less dense channels from a machine learning model, such as output channels 1 and 4 in the example of FIG. 4. However, since no torque-based pruning was performed, filters with denser weights in the pruned output channels end up being removed from the model, and existing channels end up retaining sparser filters as well. Thus, the pruning causes the removal of filters which may have undergone substantial learning during training, and that learned knowledge is now lost. After pruning, the model will take more fine-tuning time to compensate for the pruned weights and relearning this information might be difficult or impossible.

Torque-based training and pruning as shown for example in the process 300 avoids these issues and provides for a more efficient but highly accurate model than existing methods. After pruning of the machine learning model is completed in the process 300, the model layers retain the first few dense filters which perform the heavy computations. The model can then be deployed in its current state while still maintaining good accuracy, or the model can be fine-tuned to reach an even further stable state. The torque-based training and pruning methods of this disclosure assist with structured pruning, minimize storage size, and minimize computational complexity of machine learning models. This results in less flops and mac operations, thus speeding up on device inference. The torque pruning methods also reduce the total parameters while maintaining high accuracy of the network. The torque-based structured pruning of this disclosure can be applied to any model architecture used in various fields, such as classification, object detection, segmentation, and super resolution. Additionally, other techniques like network slimming, which heavily relies on BN, cannot be used for tasks such as super resolution as the use of BN drastically affects the performance of such models. However, the embodiments of this disclosure do not have a hard requirement of any additional layer, and even in the presence of a BN layer, the machine learning models of this disclosure trained and pruned using torque provide high performance.

Although FIG. 3 illustrates one example of a process 300 for torque-based training and pruning based on output channels, various changes may be made to FIG. 3. For example, multiple torque-based training steps can be performed on the machine learning layer, and the torque-based training and pruning steps can be performed on multiple layers of a machine learning model. It will be understood that the torque-based training and pruning steps of the process 300 can be performed on various machine learning models of different configurations and having any number of input or output channels. The torque-based training and pruning can also be performed based on output channels as shown in the process 300, based on input channels, or both.

Figure 5:
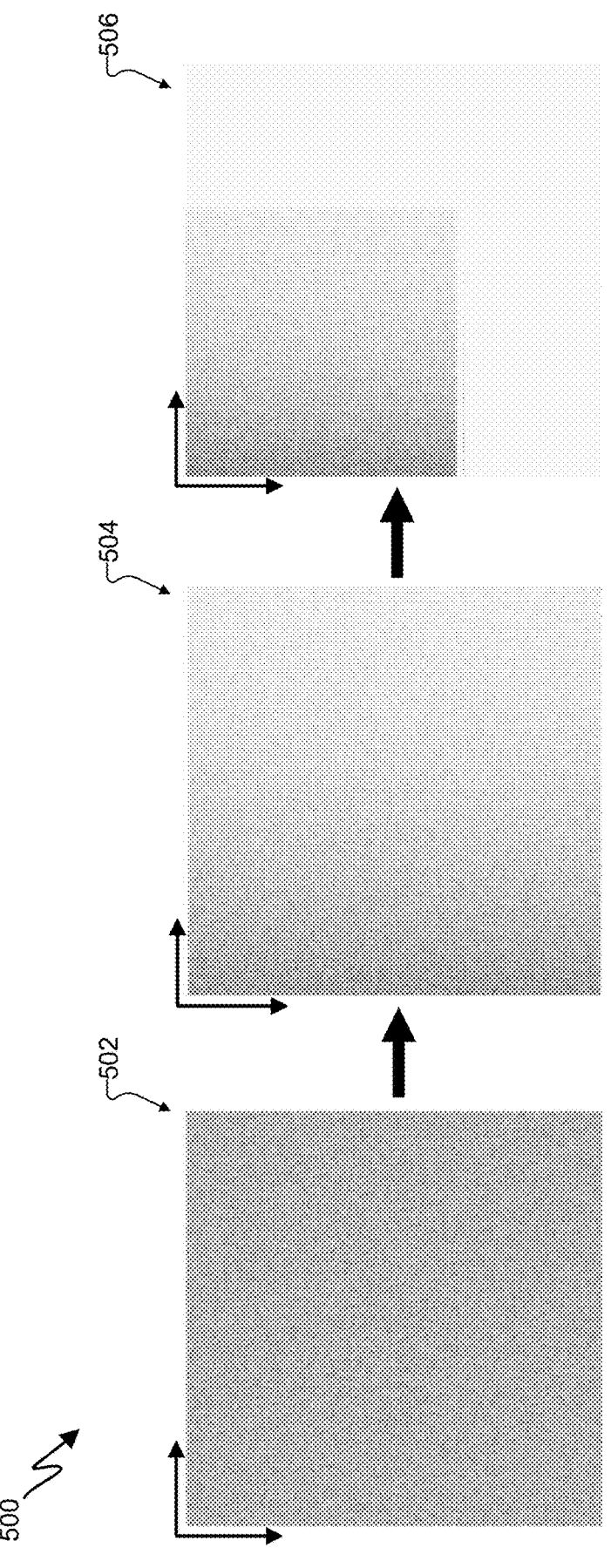
FIG. 5 illustrates an example representation of a layer of a convolutional neural network as the layer undergoes torque-based training and pruning in accordance with embodiments of this disclosure.

FIG. 5 illustrates an example representation 500 of a layer of a convolutional neural network as the layer undergoes torque-based training and pruning in accordance with embodiments of this disclosure. As shown in FIG. 5, similar to the process 300 illustrated in FIGS. 3A and 3B, at a first stage 502, the layer of the convolutional neural network has not been trained using torque-based training, with the weight density distributed throughout the layer. At stage 504, torque-based training as described in this disclosure is performed on the layer of the convolutional neural network, causing the weights to be more concentrated towards the initial channels of the layer, as illustrated by the darker shaded areas in FIG. 5 around the initial channels and lighter shaded areas around channels farther away from the initial channels. At stage 506, sparse channels and filters of the layer of the convolution neural network are pruned and fine-tuned to reach a stable state, resulting in a layer with reduced parameters and with the dense filters concentrated in the initial channels of the layer.

Although FIG. 5 illustrates one example of a representation 500 of a neural network as the neural network undergoes torque-based training and pruning, various changes may be made to FIG. 5. For example, multiple torque-based training steps can be performed on the machine learning layer, and the torque-based training and pruning steps can be performed on multiple layers of a machine learning model. Additionally, while FIG. 5 illustrates a representation of a layer of a convolutional neural network, it will be understood that the torque-based training and pruning of this disclosure can be performed on various machine learning models of various types and configurations. The torque-based training and pruning can also be performed based on output channels, based on input channels, or both.

Figure 6A:
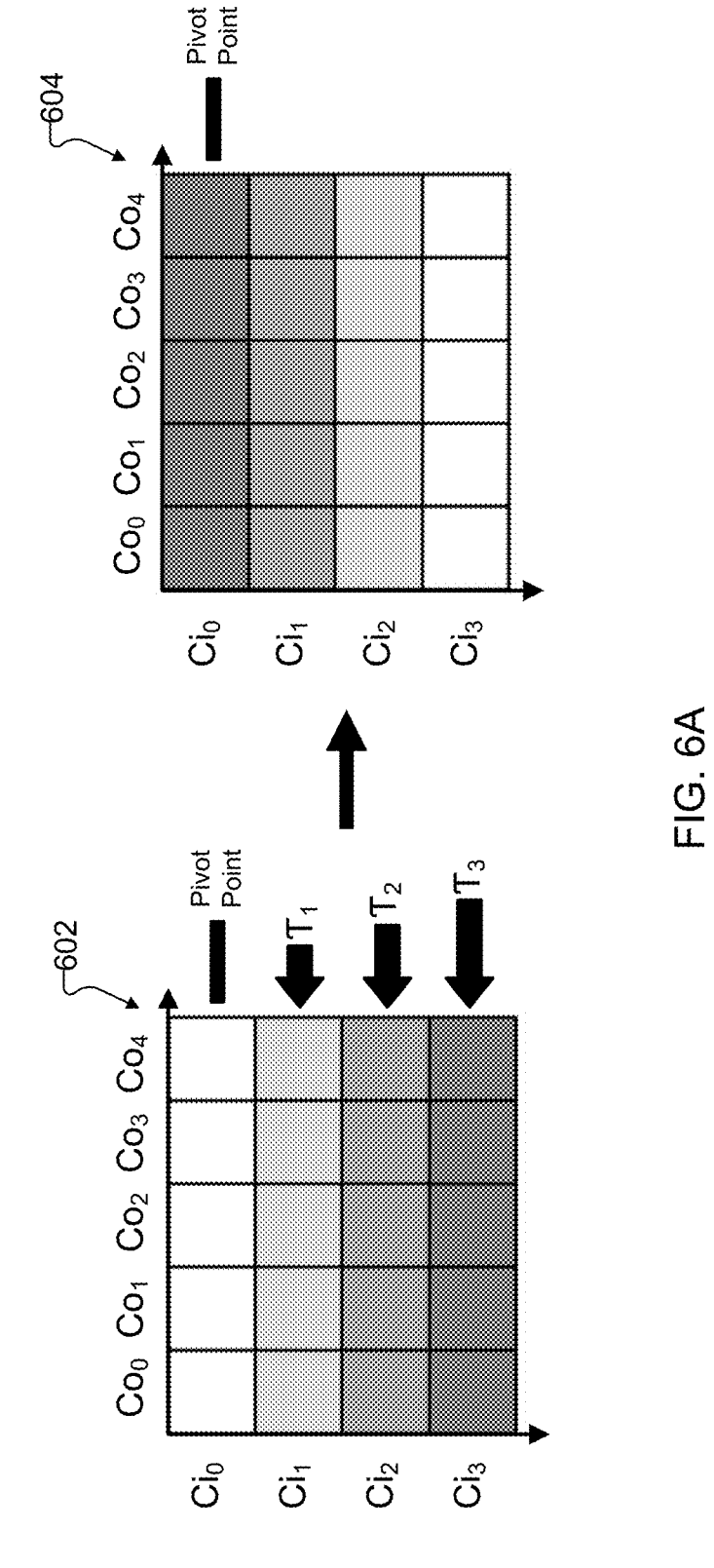
FIGS. 6A and 6B illustrate an example process for torque-based training and pruning based on input channels in accordance with embodiments of this disclosure.
Figure 6B:
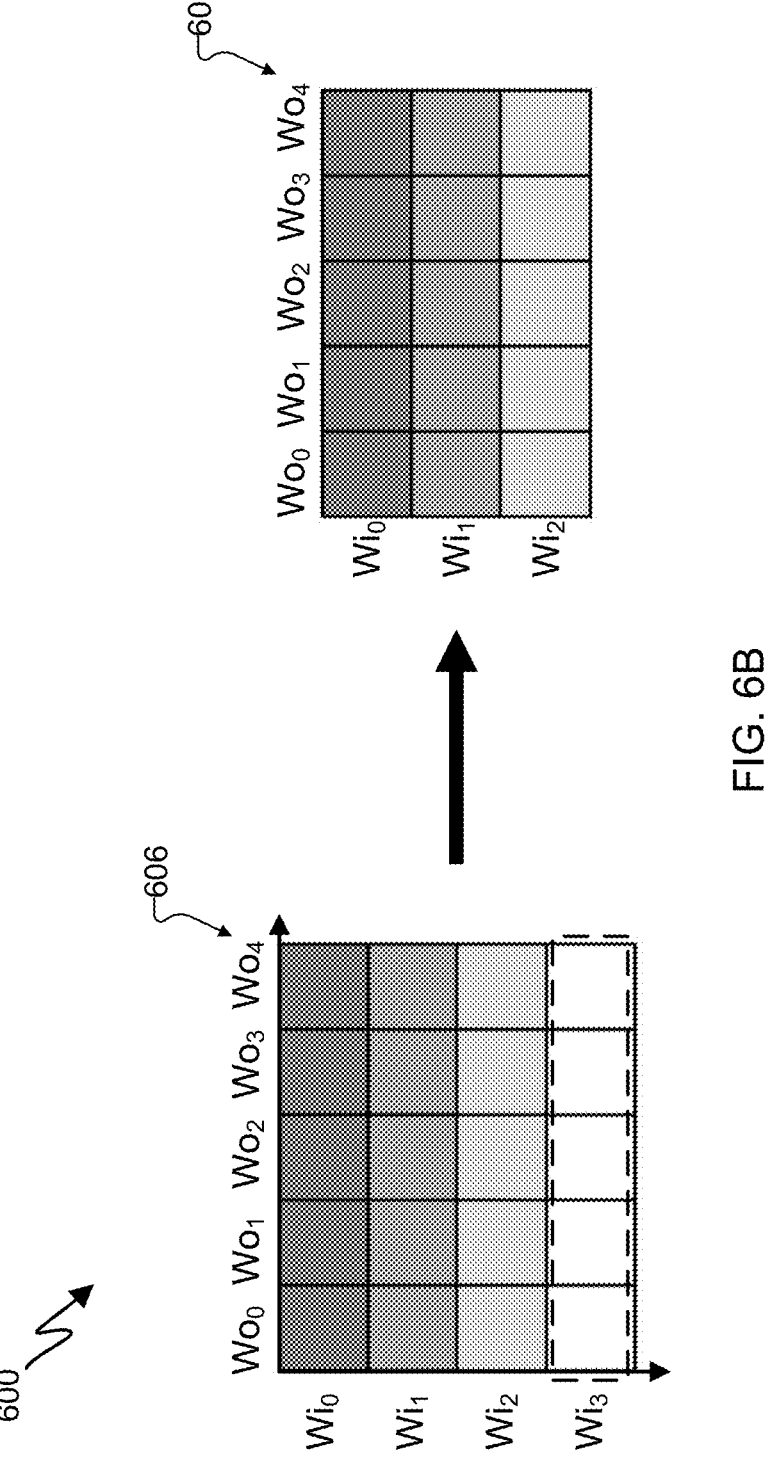

FIGS. 6A and 6B illustrate an example process 600 for torque-based training and pruning based on input channels in accordance with embodiments of this disclosure. For ease of explanation, the process 600 shown in FIGS. 6A and 6B is described as being performed using the server 106 in the network configuration 100 of FIG. 1. As a particular example, the process 600 can be executed on the server 106 in the network configuration 100 of FIG. 1, and a trained machine learning model can then be deployed to an electronic device 101 for use. However, the process 600 may be used with any other suitable device(s), such as the electronic device 101, and in any other suitable system(s).

As shown in FIGS. 6A and 6B, torque-based training and pruning can also be performed based on input channels of a machine learning model layer, where the pivot point is selected as one of the input channels. For example, as illustrated in FIG. 6A, at step 602 of the process 600, a layer of a machine learning model, such as a convolutional layer, is accessed and a pivot point for an input channel is selected. The model layer includes a weight matrix having a plurality of input channels $Ci_0$ to $Ci_n$ and a plurality of output channels $Co_0$ to $Co_n$. A torque constraint is applied to the input channels of the model layer based on the selected input channel pivot point, with increasing intensity based on the distance of the input channels from the pivot point. For example, as shown in FIG. 6A at step 602, input channel $Ci_0$ is selected as the pivot point, and each input channel has an increasing torque intensity (T) applied based on its distance from the pivot point channel $Ci_0$.

Thus, the pivot point here is the $0^{th}$ input channel/filter $Ci_0$. The constraint applied to any input channel/filter is based on how far that input channel/filter is from the pivot point. If $d_1$, $d_2$, and $d_3$ are the distances from input channel $Ci_0$ to input channels $Ci_1$, $Ci_2$, and $Ci_3$, respectively, then $d_3 > d_2 > d_1$. For instance, as shown in step 602 in the example process 600, input channel $Ci_3$ has a stronger torque intensity $(T_3)$ applied than input channel $Ci_2$ and input channel $Ci_2$ has a stronger torque intensity $(T_2)$ applied than the torque intensity $(T_1)$ applied to input channel $Ci_1$, as shown by the increasing darker shades of color of the filters at step 602. As shown at step 604 of the process 600, applying the torque-based constraint forces the input channels closer to the pivot point $Ci_0$ to have higher concentrations of weights, as shown by the increasing darker shades of color of the filters at step 604.

In embodiments of this disclosure, the model can be trained in a similar manner as that described with respect to FIGS. 3A and 3B, using one or more of Equations (3)-(13), by adding the torque-based constraint to the gradient during the backward pass in a linear or squared manner, or by adding additional loss based on the constraint to the loss function.

Once the model is trained using the torque-based constraint(s), at step 606 illustrated in FIG. 6B, input channels/filters can be selected for pruning. For example, as shown in FIG. 6B, a trained weight matrix is accessed that includes weight input channels $Wi_0$ to $Wi_n$ that correspond to the original input channels $Ci_0$ to $Ci_n$, and weight output channels $Wo_0$ to $Wo_n$ that correspond to original output channels $Co_0$ to $Co_n$. As the torque-based constraint was applied based on input channels, input channels that are now less dense can be pruned from the model layer, such as based on a threshold or other metrics, such as based on using the absolute weight of each of a set of filters or an average weight of the channels.

In the example shown in step 606 of the process 600, the input channels $Wi_3$ to $Wi_n$ are selected for pruning due to their weight sparsity as a result of applying the torque-based training. These input channels are pruned from the model, resulting in a pruned model layer as shown in step 608 of the process 600. Since only the sparse filters have been removed, not much information is lost, and, consequently, the model maintains good accuracy and takes less time to reach stability. This provides a distinct advantage over existing pruning techniques, such as that described with respect to FIG. 4. Torque-based training and pruning as shown for example in the process 600 avoids these issues and provides for a more efficient but highly accurate model than existing methods. After pruning of the machine learning model is completed in the process 600, the model layers retain the first few dense filters which perform the heavy computations. The model can then be deployed in its current state while still maintaining high accuracy, or the model can be fine-tuned to reach an even further stable state.

Although FIG. 6 illustrates one example of a process 600 for torque-based training and pruning based on input channels, various changes may be made to FIG. 6. For example, multiple torque-based training steps can be performed on the machine learning layer, and the torque-based training and pruning steps can be performed on multiple layers of a machine learning model. It will be understood that the torque-based training and pruning steps of the process 600 can be performed on various machine learning models of different configurations and having any number of input or output channels. The torque-based training and pruning can also be performed based on input channels as shown in the process 600, based on output channels, or both.

Figure 7:
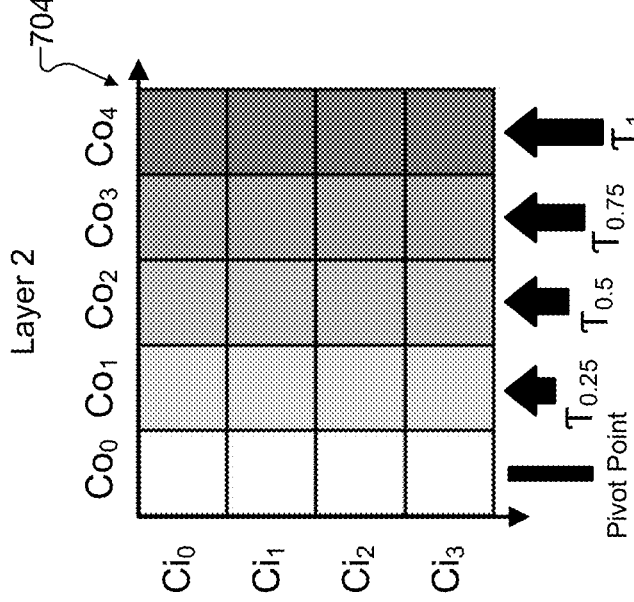
FIG. 7 illustrates an example process for normalized torque-based training in accordance with embodiments of this disclosure.
Figure 7:
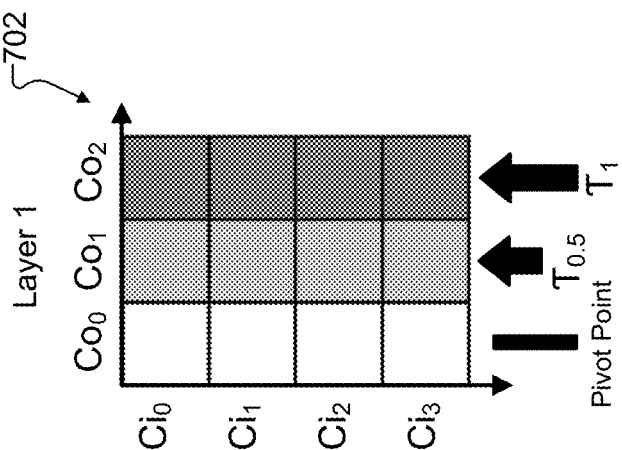
Figure 7:

FIG. 7 illustrates an example process 700 for normalized torque-based training in accordance with embodiments of this disclosure. For ease of explanation, the process 700 shown in FIG. 7 is described as being performed using the server 106 in the network configuration 100 of FIG. 1. As a particular example, the process 700 can be executed on the server 106 in the network configuration 100 of FIG. 1, and a trained machine learning model can then be deployed to an electronic device 101 for use. However, the process 700 may be used with any other suitable device(s), such as the electronic device 101, and in any other suitable system(s).

As shown in FIG. 7, in various embodiments the torque-based constraint applied to the filters can be normalized over all channels. This is achieved by normalizing the value of d such that its value ranges between 0 to 1 where d=1 corresponds to the channel farthest from pivot point. Equation (6) can thus be modified as shown in Equation (14) below.

$$\nabla = \nabla + \lambda_T (\text{sign of } W) \frac{d}{\sum d_i} \qquad (14)$$

where i ranges from 1 to $Co_n$.

For example, as illustrated in FIG. 7, a first layer 702 of the machine learning model having an output channel $Co_2$ as the farthest channel from the pivot point channel $Co_0$ thus has a torque constraint that is normalized across the channels such that the output channel $Co_1$ has a torque constraint of 0.5 and the output channel $Co_2$ has a torque constraint of 1. As also illustrated in FIG. 7, a second layer 704 of the machine learning model has an output channel $Co_4$ as the farthest channel from the pivot point channel $Co_0$. Thus, the torque constraint is normalized across the channels such that the output channel $Co_1$ has a torque constraint of 0.25, the output channel $Co_2$ has a torque constraint of 0.5, the output channel $Co_3$ has a torque constraint of 0.75, and the output channel $Co_4$ has a torque constraint of 1.

Although FIG. 7 illustrates one example of a process 700 for normalized torque-based training, various changes may be made to FIG. 7. For example, multiple torque-based training steps can be performed on the machine learning layer, and the torque-based training steps can be performed on additional layers of the machine learning model. It will be understood that the torque-based training of the process 700 can be performed on various machine learning models of different configurations and having any number of input or output channels. The torque-based training can also be performed based on output channels as shown in the process 700, based on input channels, or both. As also described in embodiments of this disclosure, pruning and other operations can be performed on the layers 702 and 704 of the machine learning model.

Figure 8A:
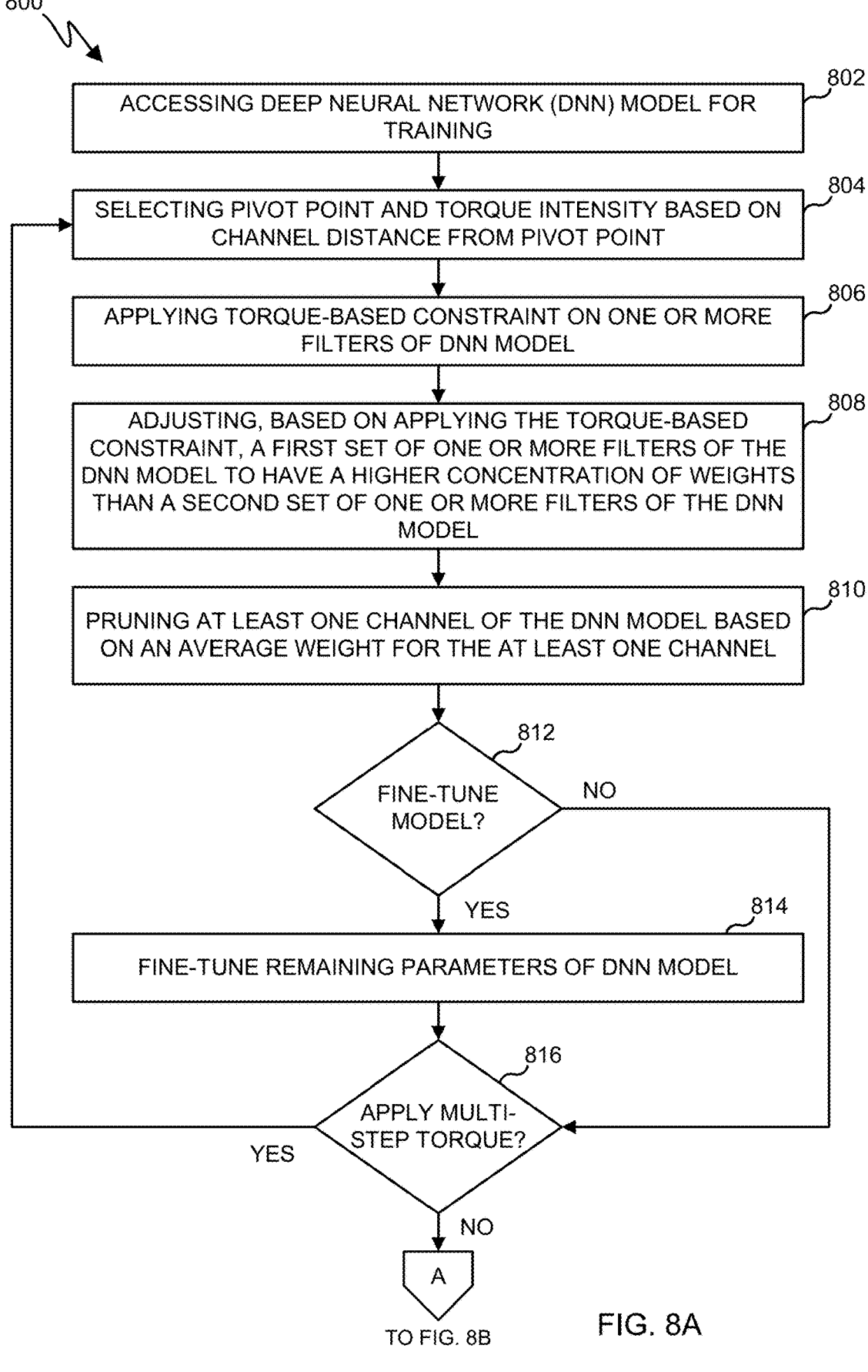
FIGS. 8A and 8B illustrate an example method for torque-based machine learning model training, pruning, deployment, and inferencing in accordance with embodiments of this disclosure.
Figure 8B:
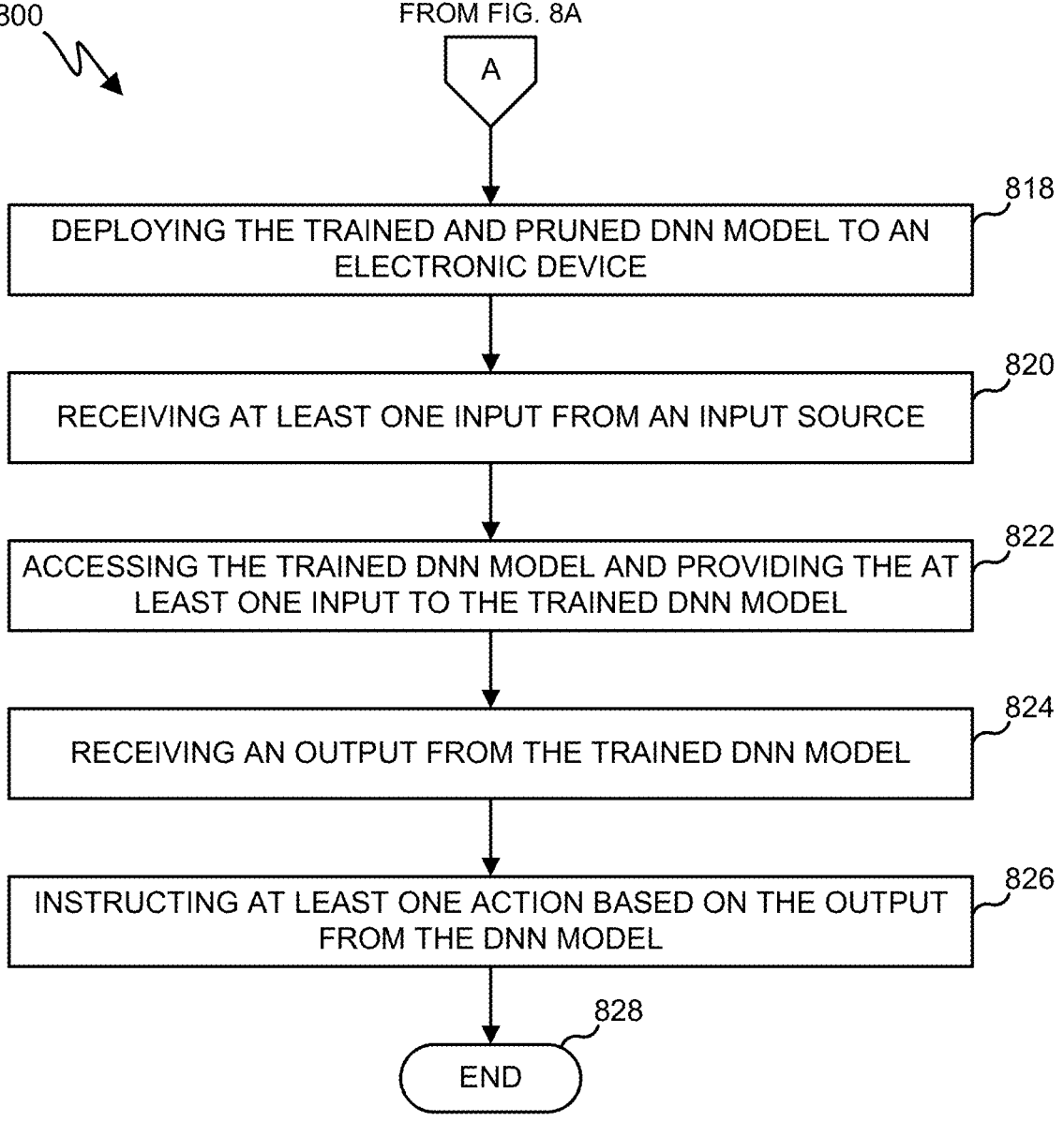

FIGS. 8A and 8B illustrate an example method 800 for torque-based machine learning model training, pruning, deployment, and inferencing in accordance with embodiments of this disclosure. For ease of explanation, portions of the method 800 shown in FIGS. 8A and 8B may be described as being performed using the server 106 in the network configuration 100 of FIG. 1, while other portions of the method 800 may be described as being performed using the electronic device 101 in the network configuration 100 of FIG. 1. As a particular example, the method 800 from blocks 802-818 could be executed on the server 106 in the network configuration 100 of FIG. 1, and a trained machine learning model can be deployed to a client electronic device 101 for use. Then the client electronic device can perform blocks 820-826. However, the method 800 may be used with any other suitable device(s) and in any other suitable system(s).

At block 802, a processor, such as the processor of the server 106, accesses a machine learning model such as a DNN for training using torque-based constraints as described in this disclosure. At block 804, the processor selects a pivot point channel of at least one layer of the machine learning model and a torque intensity for each other channel based on channel distances from the selected pivot point. The pivot point channel selected can be based on the particular structure of the layers of the machine learning model. As described in embodiments of this disclosure, the pivot point channel can be an output channel of the machine learning model, and the torque intensity is applied to the other output channels based on their distance from the pivot point output channel. In some embodiments, the pivot point channel can be an input channel of the machine learning model, and the torque intensity is applied to the other input channels based on their distance from the pivot point input channel. In some embodiments, such as when multiple torque-based training and pruning steps are performed, both input and output channels can be selected.

At block 806, the processor applies a torque-based constraint on one or more filters of the machine learning model based on the torque intensity associated with the channel of each filter. As described in this disclosure, such as with respect to FIGS. 3A and 3B, various training functions based on adding the torque constraint as an additional term during gradient updates or as additional loss in loss functions can be performed to train the machine learning model using torque. For example, the torque-based constraint can be applied during a gradient update, wherein the gradient update is based on L1 regularization or based on L2 regularization. The torque-based constraint can also be applied as an additional term, based on L1 regularization or L2 regularization, in a loss function Due to applying the torque constraint, at block 808 the processor adjusts a first set of one or more filters of the machine learning model to have a higher concentration of weights than a second set of one or more filters of the machine learning model. For instance, applying the torque constraint causes the channels of a layer of the machine learning model that are near the pivot point channel to have a higher concentration of weights than channels that are farther away from the pivot point channel. Adjusting the weights of the filters thus causes weight sparsity to increase based on the filter distance from a pivot point channel.

At block 810, the processor prunes at least one channel of the machine learning model based on a threshold, such as based on an average weight for the at least one channel. For example, since channels farther away from the pivot point have less dense weights, they become increasingly likely to fall below the threshold and, if they do fall below the threshold, these channels are removed from the layer of the machine learning model. After pruning one or more layers of the machine learning model, at decision block 812, it is determined whether to fine-tune the machine learning model. Because the torque-based training described in embodiments of this disclosure retains the dense filters of the machine learning model, very little fine-tuning is needed for the trained machine learning model to relearn any lost weights. Thus, the trained and pruned machine learning model can be deployed for direct use without fine-tuning the model, while still providing for a high accuracy rating.

If, at decision block 812, it is decided to not fine-tune the machine learning model, the method 800 moves to decision block 816. If, at decision block 812, it is decided to fine-tune the machine learning model, at block 814 the processor fine-tunes the remaining parameters of the machine learning model to relearn any lost information and increase the accuracy of the machine learning model further. At decision block 816, it is determined whether to use multi-step torque training, where at least one additional phase of torque training is conducted. If so, the method 800 loops back to perform blocks 804-816 to again select a pivot point based on input or output channels, adjust filters of the layers of the machine learning model, prune channels from the machine learning model, possibly fine-tune the machine learning model, and determine whether to perform any additional training and pruning rounds. It will be understood that fine-tuning at block 814 could occur after each round of torque-based training and pruning, after two or more rounds of torque-based training and pruning, or after completion of all rounds of torque-based training and pruning. The trained and pruned machine learning model could be deployed after one round of torque-based training or after multiple rounds.

If, at decision block 816, it is decided to cease performing torque-based training and pruning, the method 800 moves to block 818. At block 818, the trained and pruned machine learning model can be deployed to another device, such as electronic device 101, for execution of the machine learning model by at least one processor of the other device. At block 820, the processor receives at least one input from an input source, such as image data, audio data, or other inputs. At block 822, the processor accesses the trained and pruned machine learning model and provides the at least one input to the machine learning model. At block 824, the processor receives an output from the machine learning model, such as a classification result. At block 826, based on the output from the machine learning model, the processor instructs at least one action based on the output from the machine learning model. For example, the processor may instruct the electronic device to perform various actions of the electronic device, such as output an image classification to a user, play audio through a speaker of the electronic device, call a contact using the electronic device, or any other action. The method 800 ends at block 828.

Torque-based training and pruning as in the method 800 provides for a more efficient and more accurate model than existing methods. After pruning of the machine learning model is completed in the method 800, the model retains the first few dense filters which perform the heavy computations. The method 800 assists with structured pruning, minimizing space, and minimizing computational complexity of machine learning models. This results in less flops and mac operations, thus speeding up on device inference. The method 800 reduces the total parameters while maintaining high accuracy of the network. The method 800 can be applied to any model architecture used in various fields, such as classification, object detection, segmentation, and super resolution. Additionally, other techniques like network slimming, which heavily relies on BN, cannot be used for tasks such as super resolution as the use of BN drastically affects the performance of such models. However, the embodiments of this disclosure do not have a hard requirement of any additional layer, and even in the presence of a BN layer, the machine learning models of this disclosure trained and pruned using torque provide high performance.

Although FIGS. 8A and 8B illustrate one example of a method 800 for torque-based machine learning model training, pruning, deployment, and inferencing, various changes may be made to FIGS. 8A and 8B. For example, while shown as a series of steps, various steps in FIGS. 8A and 8B could overlap, occur in parallel, occur in a different order, or occur any number of times. As a particular example, multi-step torque training as shown at decision block 816 could occur prior to fine-tuning the model at decision block 812. Additionally, although the method 800 is described as being partly performed by a server, such as server 106, and partly by an electronic device, such as electronic device 101, the entire method 800 could be performed by a server or electronic device depending on the particular model training and deployment system or architecture.

Figure 9A:
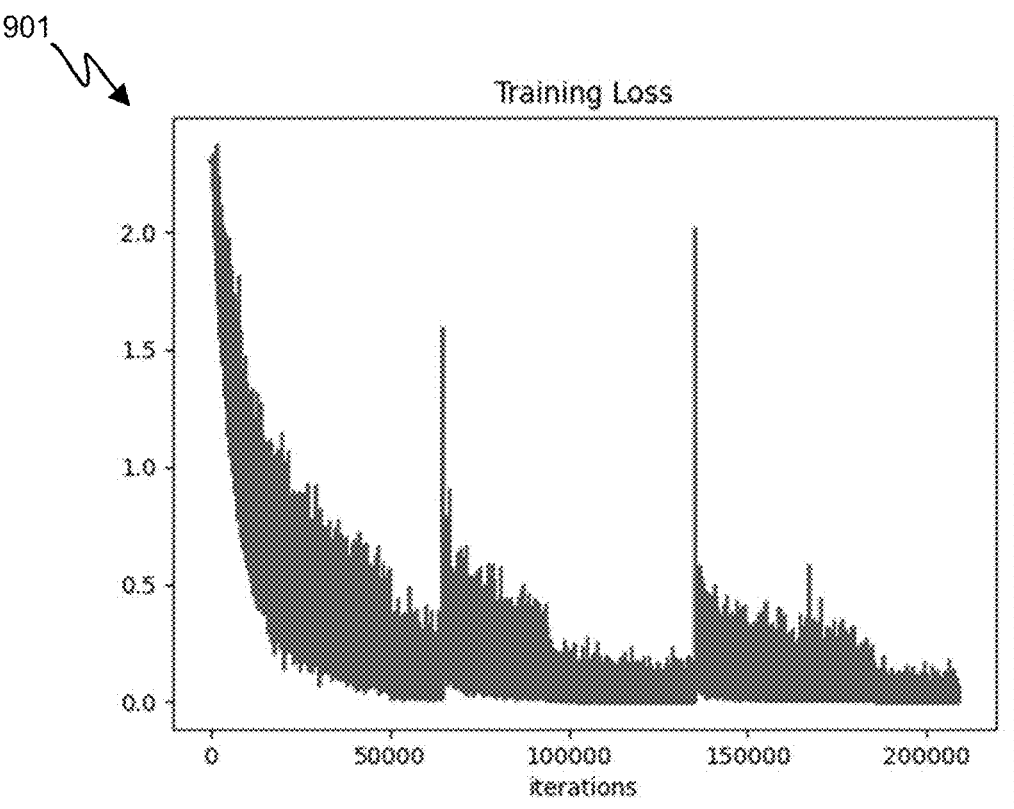
FIG. 9A illustrates example training loss results in accordance with embodiments of this disclosure.
Figure 9B:
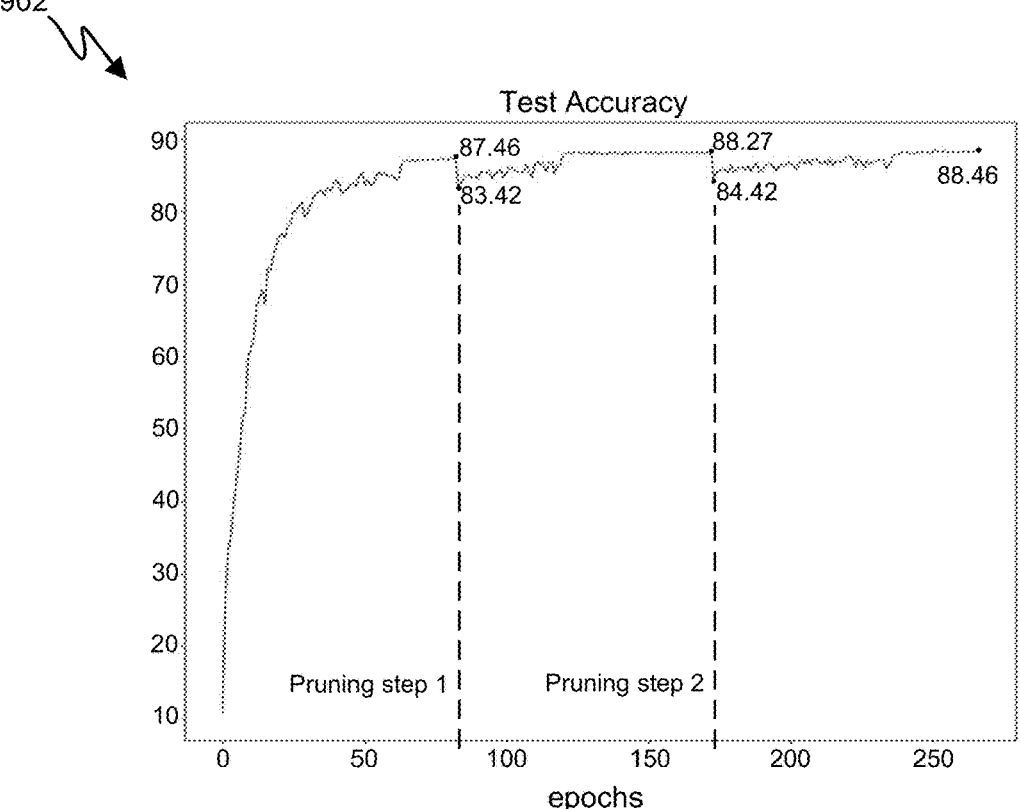
FIG. 9B illustrates example model accuracy results in accordance with embodiments of this disclosure.

FIGS. 9A and 9B illustrate example training loss and model accuracy results in accordance with embodiments of this disclosure. FIG. 9A illustrates example training loss results 901 and FIG. 9B illustrates example model accuracy results 902.

The torque-based training and pruning methods of this disclosure can introduce sparsity while training the model. By keeping a small threshold, output filters that contain less weight density can be efficiently eliminated. As most of the heavy computations are performed by the initial filters which are unpruned, fine-tuning of the model happens faster than other pruning methods, such as that shown in FIG. 4. For example, as illustrated in FIG. 9A, test results have shown that the loss for torque-based training of the embodiments of this disclosure drops quickly, indicating that machine learning models trained with the torque-based methods of this disclosure take little time to relearn the pruned weights.

Additionally, the torque pruning methods of this disclosure reduce the total number of parameters while still maintaining high accuracy. For example, FIG. 9B shows example test results showing model accuracy before and after pruning steps, and after fine-tuning of the model. As shown in FIG. 9B, after torque-based model training and before a first pruning step, the model accuracy is around 87.5% accuracy. After the first pruning step, the model accuracy only drops to about 83.5% accuracy, much less than existing pruning methods. As described in this disclosure, the model could be used without fine-tuning if desired, as the accuracy remains high even after pruning.

Additionally, FIG. 9B shows that very little fine-tuning is required for models trained using the torque-based methods of this disclosure. As shown in FIG. 9B, after the first pruning step, fine-tuning is performed to bring the model accuracy higher, up to about 88.25% in this example. This pattern continues if additional pruning steps are performed. As shown in FIG. 9B, upon performing a second pruning step, model accuracy only drops from about 88.25% to 84.42%. After a next fine-tuning step, the model then regains accuracy back up to about 88.5%, which is even higher than the original model before pruning, and the pruned model obtains the benefit of being smaller in size and less computationally intensive, enabling ease of deployment on electronic devices, especially those with limited storage or processing power.

Although FIGS. 9A and 9B illustrate one example of training loss results 901 and one example of model accuracy results 902, various changes may be made to FIGS. 9A and 9B. For example, although the results shown are generally indicative of results and benefits obtained using the torque-based training and pruning methods of this disclosure, differing loss and accuracy numbers could be obtained depending on the particular type of machine learning model used, the particular tasks the machine learning model performs, the complexity of the machine learning model, etc.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
accessing, using at least one processor of an electronic device, a machine learning model, the machine learning model trained using a torque-based constraint, wherein using the torque-based constraint includes using weaker constraints in channels near a pivot point channel of a layer of the machine learning model, and using stronger constraints in channels distal from the pivot point channel, resulting in a higher concentration of weights in the channels near the pivot point channel, and wherein at least one of the channels distal from the pivot point channel is pruned from the machine learning model;
receiving, using the at least one processor, an input from an input source;
providing, using the at least one processor, the input to the machine learning model;
receiving, using the at least one processor, an output from the machine learning model; and
instructing, using the at least one processor, at least one action based on the output from the machine learning model.

2. The method of claim 1, wherein the torque-based constraint is used during training of the machine learning model to adjust a concentration of the weights among a plurality of filters.

3. The method of claim 2, wherein the adjusting causes a weight sparsity to increase based on a filter distance from the pivot point channel.

4. The method of claim 1, wherein the machine learning model includes channels remaining after the pruning of the machine learning model using the torque-based constraint.

5. The method of claim 4, wherein the pruning of the machine learning model results in a removal of at least one channel based on an average weight for the at least one channel.

6. The method of claim 1, wherein the input is derived from image data and the output is an image classification.

7. An apparatus comprising:
at least one processing device configured to:
access a machine learning model, the machine learning model trained using a torque-based constraint, wherein using the torque-based constraint includes using weaker constraints in channels near a pivot point channel of a layer of the machine learning model, and using stronger constraints in channels distal from the pivot point channel, resulting in a higher concentration of weights in the channels near the pivot point channel, and wherein at least one of the channels distal from the pivot point channel is pruned from the machine learning model;
receive an input from an input source;
provide the input to the machine learning model;
receive an output from the machine learning model; and
instruct at least one action based on the output from the machine learning model.

8. The apparatus of claim 7, wherein the torque-based constraint is used during training of the machine learning model to adjust a concentration of the weights among a plurality of filters.

9. The apparatus of claim 8, wherein the adjusting causes a weight sparsity to increase based on a filter distance from the pivot point channel.

10. The apparatus of claim 7, wherein the machine learning model includes channels remaining after the pruning of the machine learning model using the torque-based constraint.

11. The apparatus of claim 10, wherein the pruning of the machine learning model results in a removal of at least one channel based on an average weight for the at least one channel.

12. The apparatus of claim 7, wherein the input is derived from image data and the output is an image classification.

13. A non-transitory computer readable medium containing instructions that when executed cause at least one processor to:
access a machine learning model, the machine learning model trained using a torque-based constraint, wherein using the torque-based constraint includes using weaker constraints in channels near a pivot point channel of a layer of the machine learning model, and using stronger constraints in channels distal from the pivot point channel, resulting in a higher concentration of weights in the channels near the pivot point channel, and wherein at least one of the channels distal from the pivot point channel is pruned from the machine learning model;
receive an input from an input source;
provide the input to the machine learning model;
receive an output from the machine learning model; and
instruct at least one action based on the output from the machine learning model.

14. The non-transitory computer readable medium of claim 13, wherein the torque-based constraint is used during training of the machine learning model to adjust a concentration of the weights among a plurality of filters.

15. The non-transitory computer readable medium of claim 14, wherein the adjusting causes a weight sparsity to increase based on a filter distance from the pivot point channel.

16. The non-transitory computer readable medium of claim 13, wherein the machine learning model includes channels remaining after the pruning of the machine learning model using the torque-based constraint.

17. The non-transitory computer readable medium of claim 16, wherein the pruning of the machine learning model results in a removal of at least one channel based on an average weight for the at least one channel.

18. The non-transitory computer readable medium of claim 13, wherein the input is derived from image data and the output is an image classification.

19. A method comprising:
training, using at least one processor of an electronic device, a machine learning model, wherein the training includes:
applying a torque-based constraint on one or more filters of the machine learning model, wherein using the torque-based constraint includes using weaker constraints in channels near a pivot point channel of a layer of the machine learning model, and using stronger constraints in channels distal from the pivot point channel, resulting in a higher concentration of weights in the channels near the pivot point channel, and wherein at least one of the channels distal from the pivot point channel is pruned from the machine learning model;

adjusting, based on applying the torque-based constraint, a first set of one or more filters of the machine learning model to have the higher concentration of the weights than a second set of one or more filters of the machine learning model; and pruning at least one channel of the machine learning model based on an average weight for the at least one channel.

20. The method of claim 19, wherein the adjusting causes a weight sparsity to increase based on a filter distance from the pivot point channel.

21. The method of claim 20, wherein the pivot point channel is an output channel of the machine learning model.

22. The method of claim 20, wherein the pivot point channel is an input channel of the machine learning model.

23. The method of claim 19, wherein the torque-based constraint is applied during a gradient update, wherein the gradient update is based on L1 regularization or based on L2 regularization.

24. The method of claim 19, wherein the torque-based constraint is applied as an additional term, based on L1 regularization or L2 regularization, in a loss function.

25. The method of claim 19, further comprising fine-tuning remaining parameters of the machine learning model.

26. The method of claim 25, further comprising further training the pruned machine learning model by applying an additional torque-based constraint to one or more filters of the pruned machine learning model.

\* \* \* \* \*